United States Patent [19]

Coons

[11] 3,854,627

[45] Dec. 17, 1974

[54] METHOD AND APPARATUS FOR DISCHARGING MEASURED AMOUNTS OF DOUGH

[75] Inventor: Uzal E. Coons, Oaklawn, Ill.

[73] Assignee: Wm. Wrigley, Jr. Company, Chicago, Ill.

[22] Filed: June 7, 1971

[21] Appl. No.: 150,364

[52] U.S. Cl............... 222/1, 99/90 R, 222/80, 222/410, 259/192
[51] Int. Cl........................... A21c 11/10
[58] Field of Search ............ 222/80, 238, 272, 312, 222/410, 411, 412, 413; 99/86, 90, 135; 359/6, 9, 10, 41, 45, 46, 191, 192; 425/376

[56] References Cited
UNITED STATES PATENTS

| | | | |
|---|---|---|---|
| 2,868,144 | 1/1959 | Ambrette | 99/90 R |
| 3,063,095 | 11/1962 | Limbach | 425/376 |
| 3,366,368 | 1/1968 | Hibbing | 259/45 |
| 3,482,821 | 12/1969 | Blackwood | 259/6 |

FOREIGN PATENTS OR APPLICATIONS

| | | | |
|---|---|---|---|
| 511,782 | 10/1915 | France | 222/412 |

Primary Examiner—Stanley H. Tollberg
Assistant Examiner—Larry Martin

[57] ABSTRACT

The invention resides in a method of and apparatus for discharging doughy products such as chewing gum from a kneader upon a conveyor. For subsequent processing of the products it is desirable that they be in the form of discrete loaves of predetermined size. Whereas prior discharge methods and devices discharged the doughy products upon the conveyor in a continuous ribbon which was then cut into loaves, the present apparatus forms the loaves in the first instance by the interaction of the discharge auger of the kneader and the rim of the discharge opening, thereby eliminating the operation of cutting a ribbon of the products into loaves. The discharge auger is comprised of two augers of opposite hand connected together to provide a continuous edge which traps a quantity of the products and feeds that quantity toward the center whence it is discharged laterally into and through the opening as a discrete loaf.

9 Claims, 12 Drawing Figures

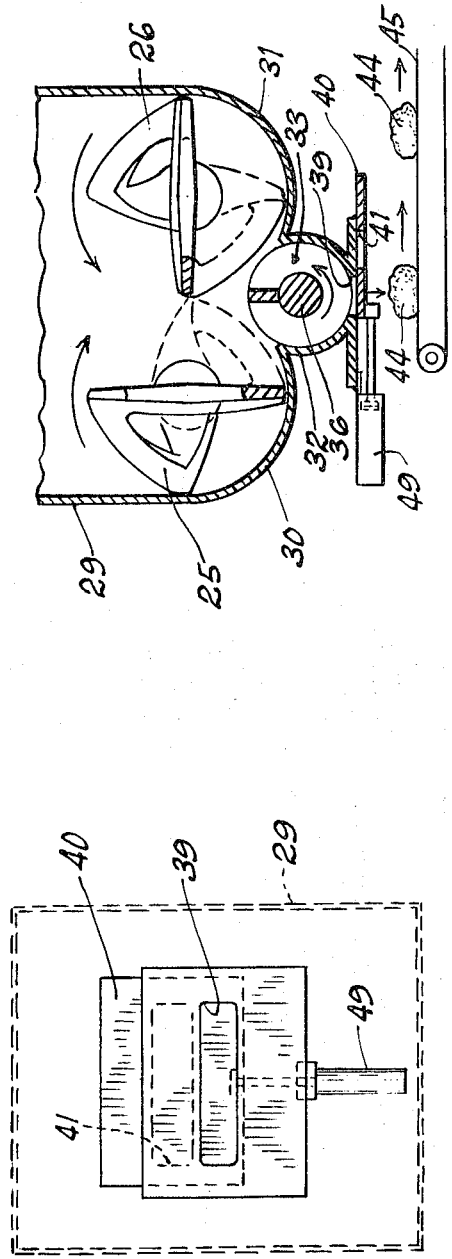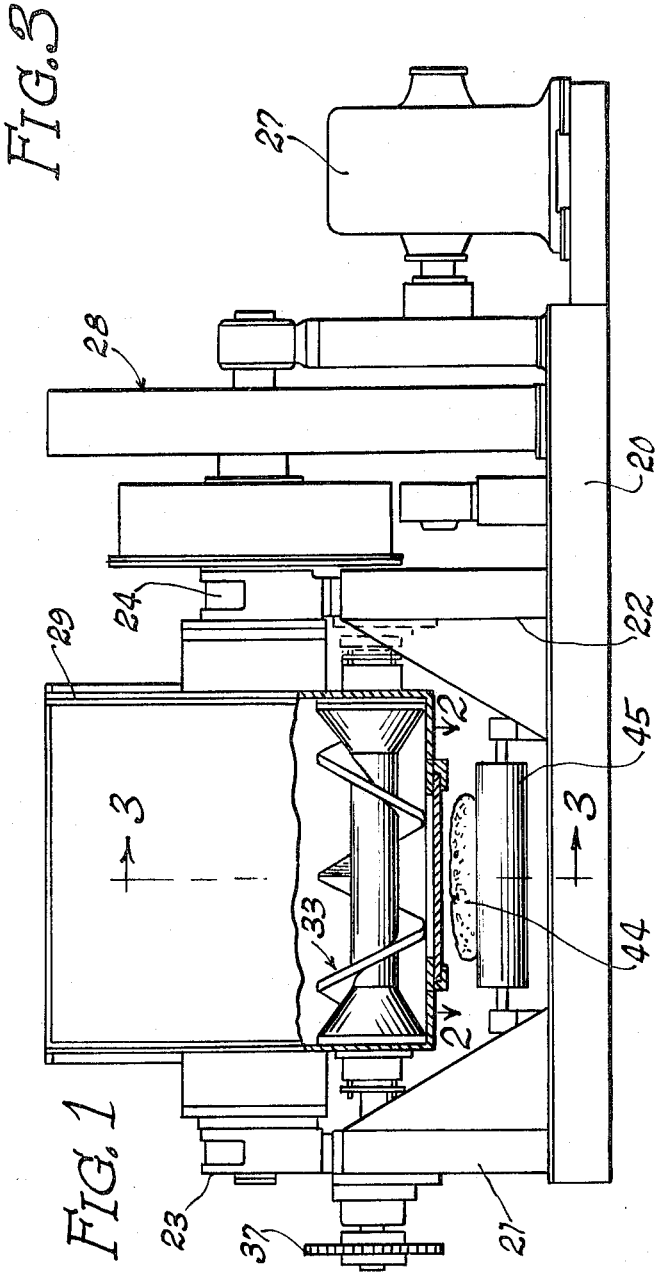

METHOD AND APPARATUS FOR DISCHARGING MEASURED AMOUNTS OF DOUGH

This invention relates to a method of and an apparatus for discharging products from a mixing and kneading machine to a conveyor or the like. For purposes of illustration, the invention will be described with reference to its application to machines for mixing and kneading chewing gum in an intermediate stage of its production, but it is understood that it is not limited to such application.

In one stage in the process of making chewing gum, the gum ingredients are placed in a kneader to mix the gum ingredients thoroughly. After the ingredients are mixed, the gum is discharged from the kneader and formed into loaves of approximately 19 pounds each for subsequent processing into sheets and then into individual sticks.

Commercially available kneaders comprise a tank in which a pair of interacting blades of special form are rotated about substantially parallel axes to mix and knead doughy products. When the products are sufficiently kneaded or mixed, the tank is inverted and the products are dumped upon a table, conveyor or cart for removal from the kneader. This leaves the products in a large mass which must be divided into smaller portions or "loaves" for subsequent processing. In a more improved version of this kneader, an extruder in the form of an auger is built into the bottom of the tank, so that when the kneading operation is finished, instead of inverting the tank, the auger is operated to carry and squeeze the products from the tank through an opening aligned axially with the end of the auger. The products fall upon an adjacent conveyor in the form of a continuous ribbon which must subsequently be cut into loaves for further processing.

One of the objects of this invention is to provide an improved process for kneading, discharging and forming into loaves a doughy product, wherein the step of forming into loaves is combined with the step of discharging the product from a kneader for greater simplicity and economy of operation.

Another object of this invention is to provide kneading apparatus for doughy products in which an extruder auger is provided for emptying the kneader, the auger cooperating with a discharge opening adjacent to the side of the auger in a manner to discharge laterally and cut off a fixed quantity of the products with each revolution of the auger.

A further object of this invention is the provision of a kneading apparatus for doughy products which uses a fixed tank for the products and in which are a pair of rotating mixing blades below which is an extruder in the form of an auger designed to push the products from the ends of the auger toward its middle, the tank having a discharge opening below and adjacent to the middle of the auger. The products are discharged by the auger through said opening and cut off between the auger and the rim of the opening at each revolution of the auger to form the discharged products into individual loaves.

These and other objects of this invention will become apparent from the following detailed description thereof when taken together with the accompanying drawings in which:

FIG. 1 is a side elevational view of a kneader incorporating the discharge method and apparatus of this invention, a portion of the kneader being cut away to show the extruder;

FIG. 2 is a plan view of the bottom of the kneader taken along line 2—2 of FIG. 1;

FIG. 3 is an elevational view in section of the kneader taken along line 3—3 of FIG. 1;

Figure 4:
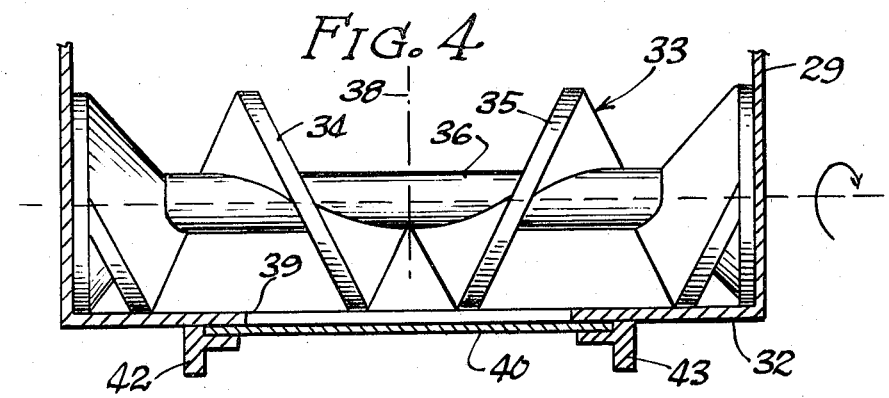
FIG. 4, 5 and 6 are diagrammatic side elevational views of the auger and gate of the extruding mechanism, the views showing the auger in three successive positions in one cycle of operation of the auger.

Briefly described, the method of this invention comprises forming the discharge auger of the prior art as two flights of opposite hand joined together at their adjacent ends and symmetrically arranged both axially and angularly so that the two flights meet along a radius. With an auger shaped in this manner, the discharge opening is placed below the center of the auger. As the auger rotates, the products are fed from the ends of the auger toward its middle, and since the two flights meet in a common radial wall the products cannot move axially past the meeting point, but must move radially outwardly. As they move out through the central opening adjacent the auger, the edges of the two flights cooperate with the edges of the opening in the manner of a shear, progressively to cut off the products trapped in the flights and in this manner form an elongated loaf. The latter drops on a moving conveyor below the opening. A loaf is formed at each revolution of the auger so that the tank is completely discharged upon the conveyor in the form of a series of loaves, each of approximately the same size and shape. A slidable gate is provided for the opening to close the opening while the products are kneaded.

Referring now to FIGS. 1, 2 and 3 for a more detailed description of the invention, the apparatus employed in carrying out the novel method may comprise a base 20 on which are supported spaced standards 21 and 22 each of which supports one of a pair of bearings 23 and 24 for the shafts of cooperating mixing or kneading blades 25, 26 of a form commonly known as a "sigma" blade. Said blades 25, 26 are rotated in opposite directions as shown by the arrows in FIG. 3, by a motor 27 through appropriate gearing indicated generally by the reference character 28.

Sigma blades 25 and 26 are disposed within a fixed, substantially rectangular tank 29 the bottom of which at the outer regions thereof is curved to conform to the path taken by the sigma blades, i.e., of a substantially cylindrical contour as shown at 30 and 31.

As may be observed from FIG. 3, the region in the lower central portion of the tank outside the path of movement of blades 25 and 26 is a "dead" region where the contents of the tank to be kneaded or mixed may lodge substantially unmixed, or, at best, not mixed to the same degree as the contents at the upper regions of the tank which, in addition to being agitated by the blades, are held in the blades by gravity. To relieve this situation in prior art structures, an extruder auger was placed in the lower central or "dead" regions of the tank, the bottom of the tank being extended below the cylindrically contoured portions 30, 31 to provide a substantially cylindrical cavity 32 for the auger. Said cavity 32 conformed relatively closely to the cylindrical surface generated by the outer ends of extruder auger as it was rotated. In such prior constructions, however, the auger helix was made continuous from end to end and of the same hand so that the contents of the tank in the "dead" space were urged to one end of the auger and then up into the mixing blades. To discharge the contents of the tank in such prior construction, the auger was reversed in its direction of rotation so that the contents were urged in the opposite direction and toward a gated discharge opening. The gate was opened to allow the material to be extruded therethrough in the form of a continuous ribbon upon a suitable conveyor or other device.

In the present invention, the contents of the tank may be assumed to be a substance such as material which is used in the manufacture of chewing gum. Said material, after being thoroughly kneaded and mixed, is rolled into sheets and cut into the familiar rectangular sticks for subsequent packaging. The rolling operation is best performed upon relatively small, uniform quantities or loaves of the kneaded chewing gum material which for purposes of illustration may be taken as weighing 19 pounds each. The total weight of a batch in the tank may be 1,700 pounds.

Thus, in the prior mixing and kneading apparatus the extruded ribbon required a subsequent step of cutting into loaves which then had to be separated from the ribbon and treated independently. According to the present invention, however, it has been discovered that by modifying the auger to comprise two augers of opposite hand symmetrically arranged around a shaft both axially and angularly and abutting one another, a discharge opening at the bottom of the tank may be used through which the contents are emptied. However, instead of being extruded in the form of a ribbon, the feeding of the contents from the ends of the auger toward the center thereof and the operation of the edges of the auger passing over the edges of the opening will shear off a quantity of the contents at each revolution of the auger. In this manner a loaf is formed automatically without requiring a separate cutting operation, and the loaves may be made to fall upon a moving conveyor so that they remain separated from one another and are evenly spaced on the conveyor for subsequent processing into sheets and sticks.

Figure 5:
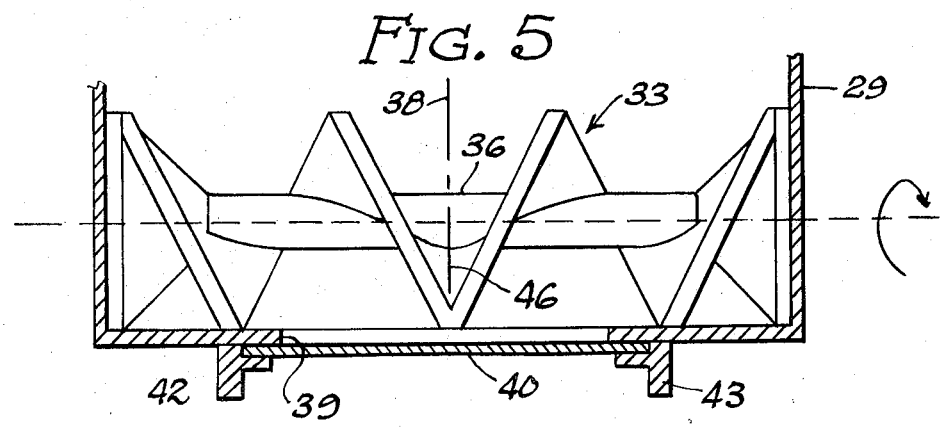
Figure 6:
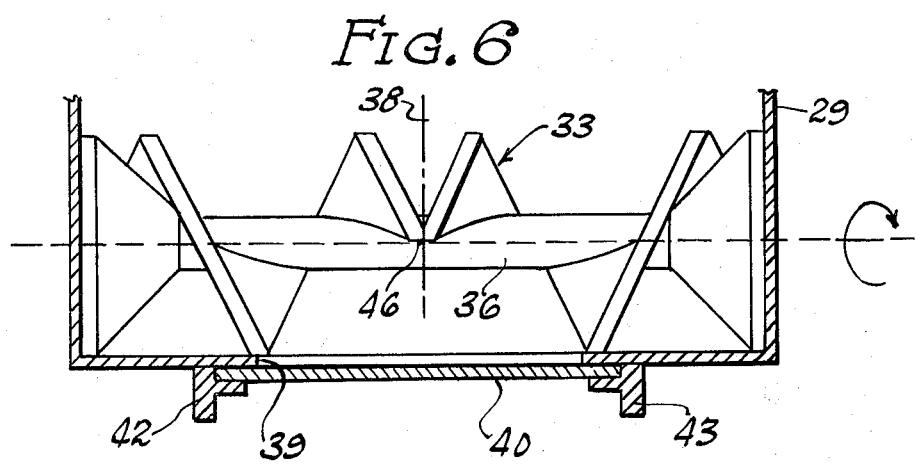
Figure 7:
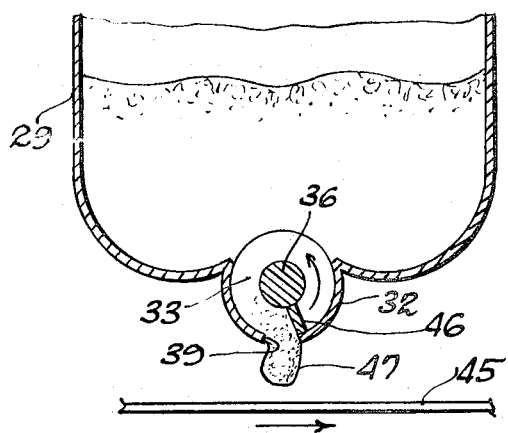
FIGS. 7–12 are diagrammatic elevational views of the auger similar to FIG. 3 showing successive stages in the formation of a loaf.

Thus, as shown in FIGS. 4, 5 and 6, the auger 33 is formed from a pair of auger helixes or flights 34, 35 of substantially identical contour but of opposite hand and secured to a central drive shaft 36 mounted in standards 21 and 22 and driven by appropriate means (not shown) through a coupling 37. Auger flights 34, 35 are symmetrically arranged about a central plane 38 in an axial direction and about the shaft 36 in and angular direction so that they meet or converge on a radius at 46 formed in plane 38 and thereby preclude movement of the contents from one side of one auger flight to the opposite side of the other auger flight. It should be noted that the axially inwardly facing surfaces of flights 34 and 35 mounted on shaft 36 converge along radius 46 and cooperate with a portion of the inner cylindrical surface of cavity 32 to define a space or volume to receive doughy product delivered in an axial inwardly rectilinear direction by action of flights disposed axially outwardly on the auger from flights 34 and 35. In effect this space may hold a predetermined volume of doughy product that rotates with the auger and is ultimately discharged radially therefrom through opening 39. The rotatable space receives its contents in a substantially axial rectilinear direction from cavity 32 and moves the same toward the center where they are trapped and from which they can escape only in a radial direction by moving through opening 39.

In summary, it should be noted that the auger includes a portion thereof that imparts rotary motion to the doughy product and is therefore termed rotatable means which cause the product to be severed and discharged from the mass of the contents of the container. Also, the auger includes a portion that imparts axial rectilinear movement to the doughy product and is termed additional means. The additional means makes it possible for the rotatable means to receive a constant volume of product for subsequent imparting of rotational movement thereto for eventual discharge through opening 39.

Below auger 33 and symmetrically disposed with respect to the central plane 38 of the auger, is an opening 39 in the cavity wall 32, said opening, as shown more clearly in FIG. 2, preferably being of rectangular shape, the longer dimension being disposed axially of the auger and the short dimension transversely thereof. Immediately adjacent opening 39 is a gate 40 which may be provided with a rectangular opening shown in dotted outlines at 41 and of substantially the same size as opening 39. Gate 40 may be reciprocated in grooved supports or gibs 42, 43 (FIG. 4) by an appropriate power means such as the well known hydraulic or air cylinder 49. The axial dimension of gate 40 determines the length of the loaf, and in the form chosen to illustrate this invention, is substantially equal to the axial distance between the edges of the flights taken approximately 270° away from the radial junction 46 of the two flights.

According to the method of this invention, tank 29 is charged with the gum base and other materials to be mixed and kneaded together, and when filled, sigma blades 25, 26 are rotated in opposite directions as shown in FIG. 3 while auger 33 is rotated in the direction shown in that FIG. by the arrow adjacent auger drive shaft 36. The contents which normally would fall into the dead space in the lower central region of the tank are continually moved toward the center of the tank by the oppositely handed flights 34 and 35 of auger 33 where they are pushed upwardly into the sigma blades and remixed with the remaining contents of the tank. It has been found that the mixing action of auger 33 added to that of sigma blades 25, 26 is more efficient than the mixing action with the single-handed auger of the prior apparatus. This means that the mixing time can be decreased.

When the contents are deemed to have been kneaded and uniformly mixed, gate 40 is moved to align opening 41 therein with discharge opening 39. With the sigma blades 25, 26 continuing to rotate simultaneously with auger 33, the contents of tank 29 are discharged through the two aligned openings 39 and 41. The discharged contents take the form of loaves 44 which fall upon a moving conveyor 45 located below opening 39 and are carried off in spaced relation to one another to another station where further processing takes place.

The formation of the loaves is depicted diagrammatically in FIGS. 7–12 inclusive. In these FIGS. the tank 29, auger cavity 32 and the auger 33 are shown diagrammatically as a section taken through the tank and auger through the center of the auger, i.e., along the axis of axial symmetry 38. Thus, the auger is depicted as a radially extending blade 46. The sigma blades 25, 26 are omitted for the sake of clarity, but they serve to continue to direct the contents of the tank toward the auger 33 as the latter moves the contents through the discharge opening 39 until the entire tank is substantially empty.

Figure 8:
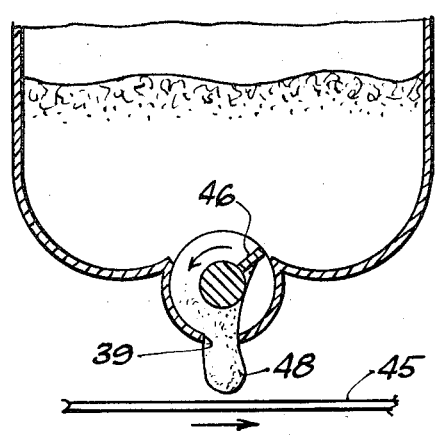
Figure 9:
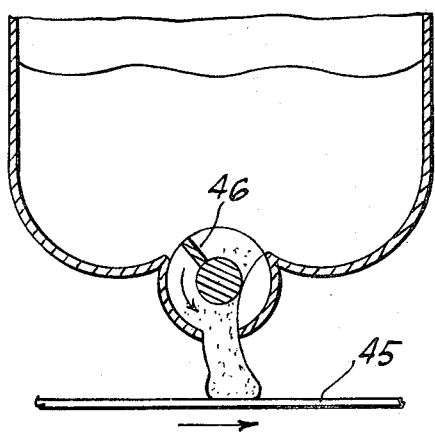
Figure 10:
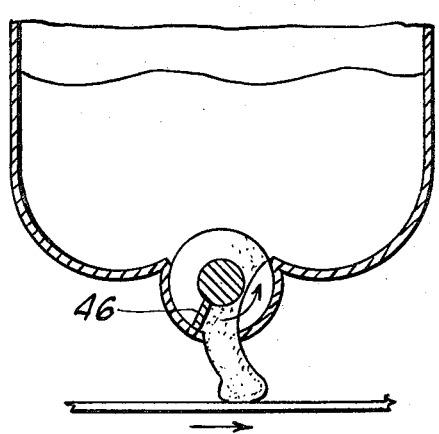
Figure 11:
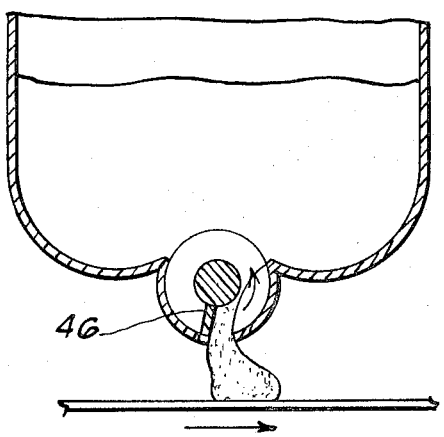
Figure 12:
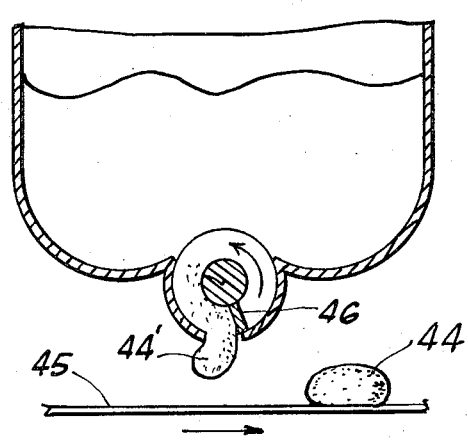

Assuming a starting position wherein the radially disposed central blade section 46 is at one edge of opening 39, the back of the auger is exposed to the opening and any material therein will be pushed or extruded through opening 39 to form the initial bulge 47 of the discharging contents. In FIG. 8, the auger has moved through 90° and the material ahead of auger 46 and trapped therein is pushed through opening 39 to enlarge the bulge 47 as shown at 48. Further rotation of the auger through an additional 90° forces more material out of the opening 39 and upon conveyor 45. In FIG. 10, the radial edge 46 has reached the opposite edge of opening 39 from which it started, and as the auger sweeps over the opening 39 as shown in FIG. 12 the extruded portion is cut off by the action of the outer edge of the auger as it moves across the edges of the opening 39. In FIG. 12, depicting the auger in the starting position shown in FIG. 7, a loaf 44 has been completely formed and severed from the contents of the tank and moved by conveyor 45 away from under opening 39. A new loaf 44' is beginning to form behind blade 46. The periodic formation of the loaves 44 continues until the contents of the tank are substantially completely discharged. At that stage gate 40 is moved to the position shown in FIG. 2 to close opening 39, and the tank may be charged with a new batch of ingredients.

Thus, the mere opening of gate 40, without changing the direction of auger 33 or stopping the rotation of sigma blades 25, 26 automatically discharges the contents of the tank as a series of separate loaves on a conveyor thereby saving time in the operation of the apparatus and in eliminating an additional operation previously required to cut the discharged ribbon of contents into discrete loaves. In addition, the rotation of auger 33 with sigma blades 25, 26 during the mixing operation, increases the efficiency of the mixer as a whole and decreases the mixing time for a given batch.

The size and shape of opening 39 determines the size and shape of a loaf 44. A two-part auger of oppositely handed flights has been used to illustrate what is deemed to be the best form of this invention, but it is understood that other means may be devised to move the tank contents axially and then radially into a discharge opening. It is understood further that although the foregoing description has been directed to the formation of loaves of gum base mixed with ingredients necessary or desirable to form chewing gum, the method and apparatus of this invention can be used with other doughy substances, and the scope of the invention therefore is not to be limited to the application illustrated herein but is to be determined by the appended claims.

I claim:

1. Apparatus for manipulating doughy products, said apparatus comprising a container for the products, a discharge opening in the bottom region of the container, rotatable means for moving a portion of the products opposite said opening in a radial direction said radial direction being oriented about a longitudinal axis of said rotatable means, additional means for moving products into said rotatable means behind said radially moving portion, said rotatable means pushing part of the radially moving portion through said opening and severing means on said rotatable means cooperating with the edge of said opening to sever said part from said radially moving portion and thereby form and discharge said part from the container as a discrete loaf.

2. Apparatus as described in claim 1 said rotatable means comprising converging surfaces forming an apex and adapted to sweep across the edges of said opening with shearing action.

3. Apparatus as described in claim 1, said additional means for moving products into said rotatable means comprising an auger, and means for rotating said auger in a direction to advance the products along said auger into said rotatable means.

4. Apparatus as described in claim 3, said rotatable means comprising an extension of the auger for moving products into said opening, and means for inhibiting further axial movement of said products.

5. Apparatus as described in claim 4, said means for inhibiting further axial movement of said products comprising a second auger axially aligned with said first-mentioned auger and adapted to move products in the opposite direction to that moved by said first auger.

6. The method of forming discrete loaves of a doughy product from a quantity of said product, comprising confining said quantity in a tank having a bottom discharge opening, imparting continuous movement to a portion of said quantity over said opening in an axial rectilinear direction, inhibiting said axial rectilinear movement at a point over said opening, changing the direction of said axial rectilinear movement to a radial outward movement, severing said portion of said quantity by rotational force, and discharging said portion through the opening to form a discrete loaf.

7. The method as described in claim 6, said inhibiting of said axial rectilinear movement comprising the steps of imparting continuous movement to an additional axially aligned portion of said quantity over said opening in an axial rectilinear direction in opposition to the axial rectilinear movement of said first-mentioned portion.

8. The method as described in claim 6, including the step of kneading the quantity of the product in the tank while forming said loaves.

9. The method as described in claim 7, said steps of imparting opposing axial movements to axially aligned portions of said quantity comprising augering said portions with a single auger having formed thereon oppositely handed flights abutting one another and being symmetrically arranged axially and angularly on said auger.

* * * * *